Patented June 5, 1928.

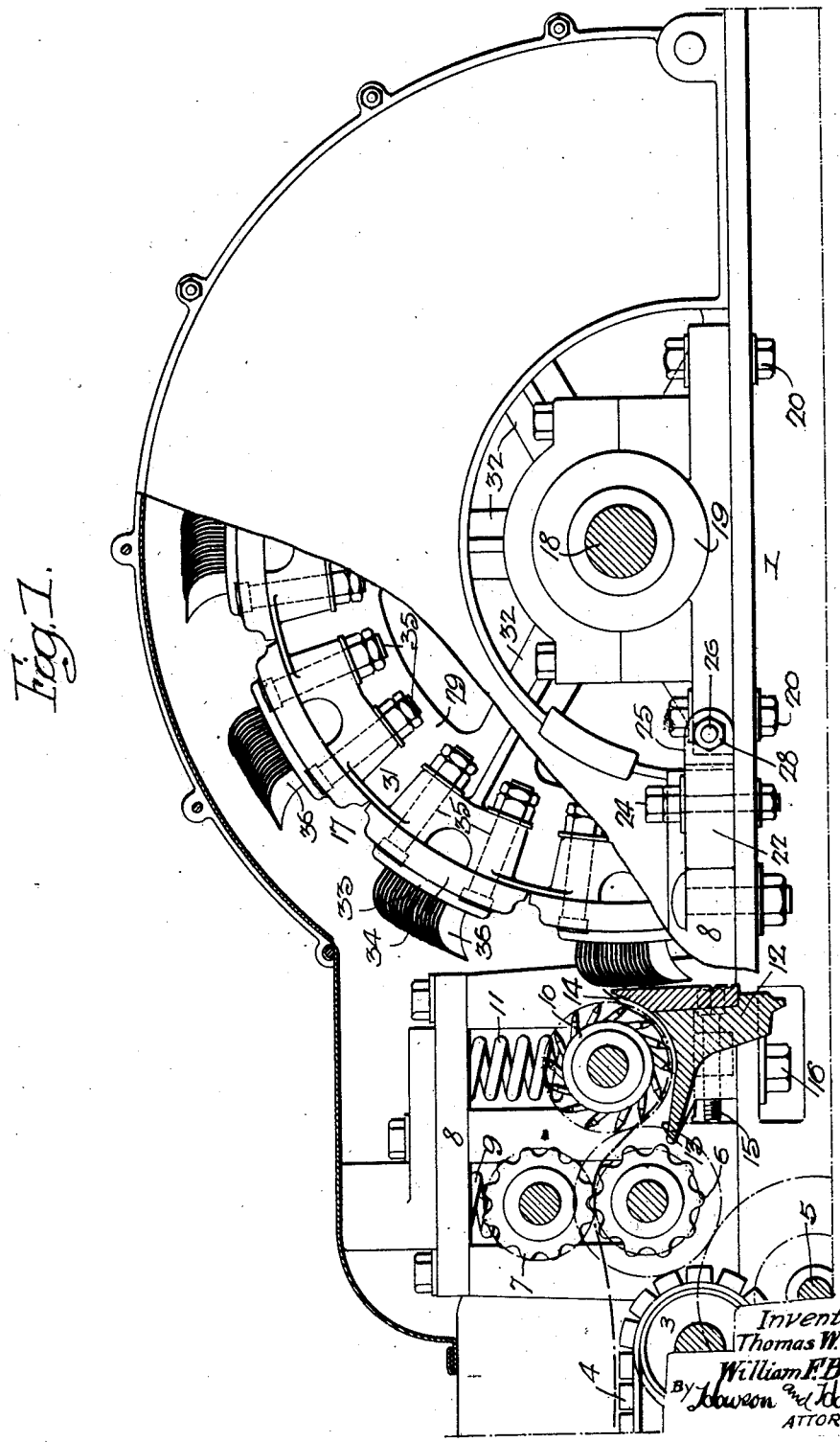

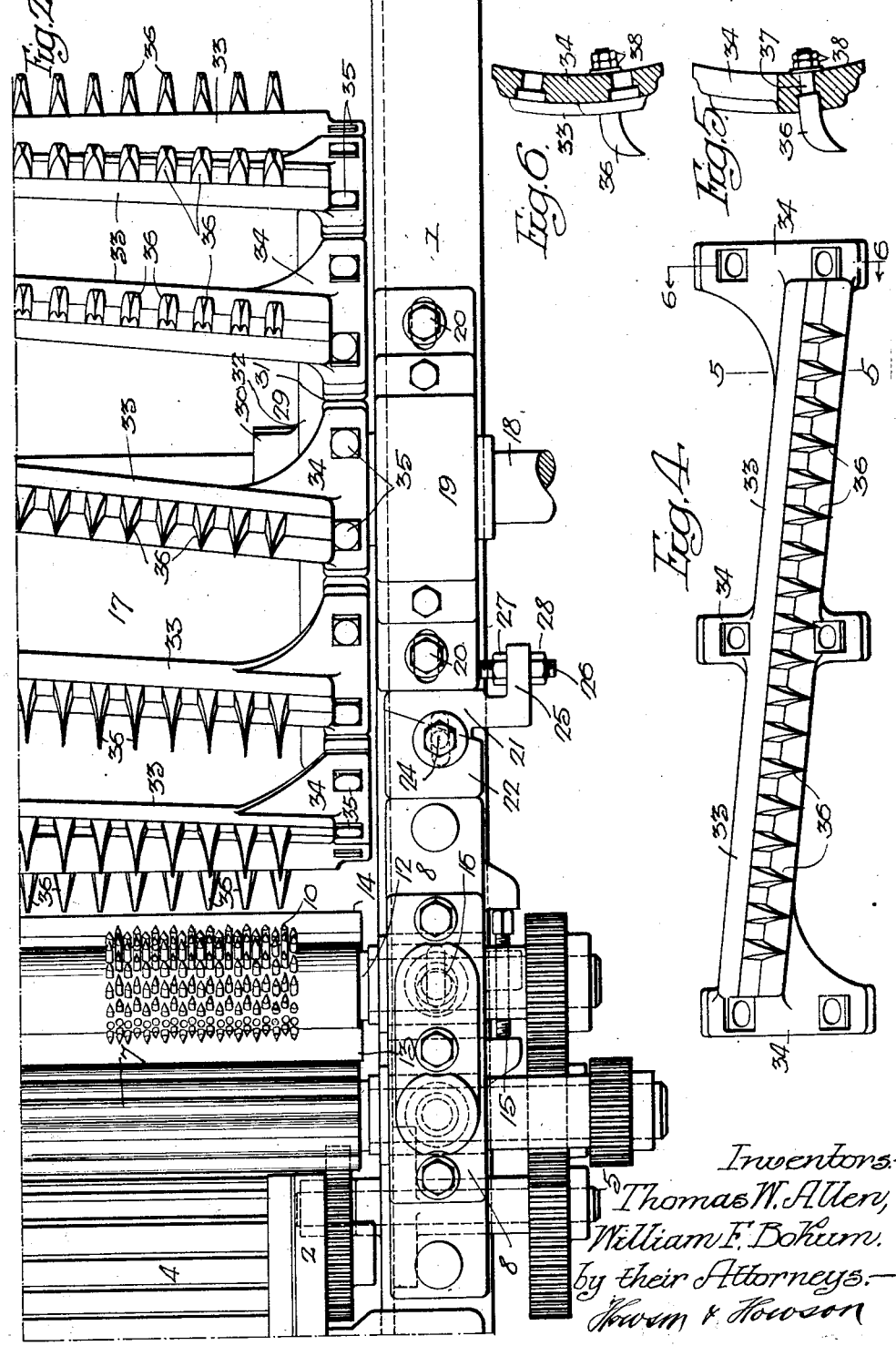

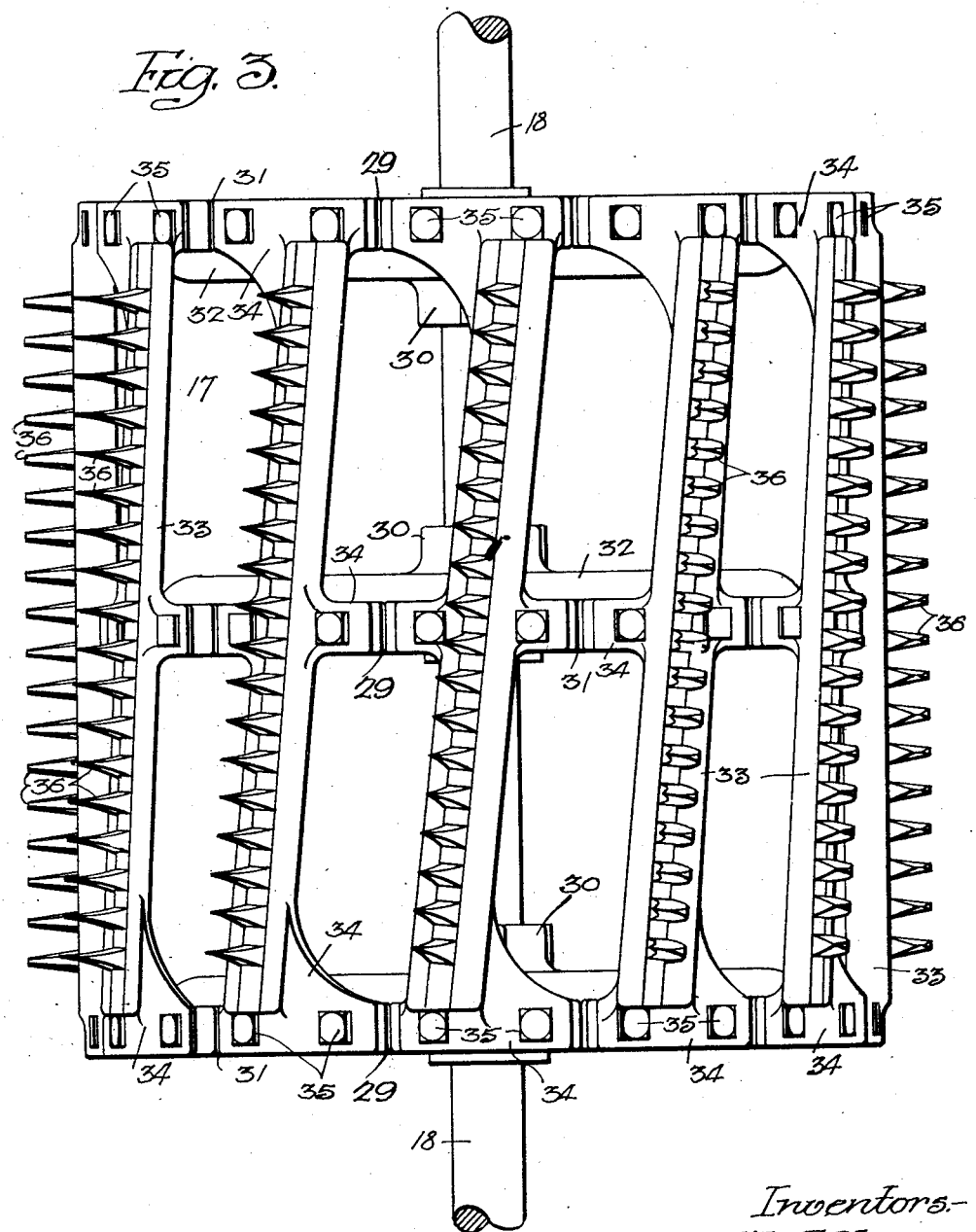

1,672,704

UNITED STATES PATENT OFFICE.

THOMAS W. ALLEN, OF PHILADELPHIA, AND WILLIAM F. BOKUM, OF JENKINTOWN, PENNSYLVANIA, ASSIGNORS TO PROCTOR AND SCHWARTZ, INCORPORATED, OF PHILADELPHIA, PENNSYLVANIA, A CORPORATION OF PENNSYLVANIA.

PICKER.

Application filed October 31, 1925. Serial No. 65,932.

Our invention relates to certain improvements in picking or shredding machines used in the textile industry for reducing cloth and like material to fibres.

The object of our invention is to improve the construction of pickers, particularly the construction of the picker cylinder and the means for adjusting the cylinder in respect to the feeding means.

In the accompanying drawing:

Fig. 1 is a side view partly in section of a picker, illustrating our invention;

Fig. 2 is a plan view of a portion of one side of the machine;

Fig. 3 is a detached plan view of the picker cylinder;

Fig. 4 is a detached view of one of the picker bars;

Fig. 5 is a sectional view on the line 5—5, Fig. 4; and

Fig. 6 is a sectional view on the line 6—6, Fig. 4.

The side frames 1 of the picker are shaped in the usual manner. The bearings 2, for the shaft of the drum 3, around which the inner end of the endless feed-apron 4 passes, are mounted on the frames, the outer end of the apron 4 passing around the usual adjustable drum, not shown.

The shaft for the inner feed-drum 3 is driven by gearing from a shaft 5. This shaft 5 drives the lower corrugated feed roll 6. The upper feed roll 7 is geared to the lower feed roll 6. Between the boxes of the upper feed roll and the housings 8 are springs 9.

In the housings 8 are the bearing blocks for the toothed feed roller 10. Springs 11 are mounted between the blocks and the housings, as shown in Fig. 1, so that the feed roller 10 is held yieldingly in position in respect to the shredding bar 12, which is curved to conform to the feed roller and has a flat extension 13 which terminates near the lower corrugated roller 6. The teeth of the feed roller 10 are sharp and are arranged on a tangent as shown, so as to hold the fabric near the shredding point.

Secured to the bar 12 is a plate 14, the upper surface of which is curved to conform to the curved surface of the bar. The material to be shredded is fed over the upper edge of the plate by the feed mechanism. The bar is adjustably mounted on the frame, being held to the frame by bolts 16 and adjustable towards and from the picker by setscrews 15, which are adapted to lugs on the bar and bear against fixed lugs on the housing.

The picker cylinder 17 is secured to a shaft 18, mounted in bearings 19 resting on the side frame 1. The bearings are slotted, and securing-bolts 20 pass through the slots into the side frames.

In order to accurately adjust the picker cylinder in respect to the shredder bar 12, a wedge 21 is located between the end of each bearing 19 and a beveled edge block, 22 which is held to the frame by a bolt 24. The frame is slotted for the passage of the bolt. This block 22 is in contact with the end of the housing 8 in which the shredder bar 12 is mounted. The wedge 21 has an angular extension 25 through which extends a stud 26 that projects from the side of the bearing 19, and on the stud at each side of the extension are nuts 27 and 28. By this construction, the wedge can be accurately adjusted and held rigidly after adjustment, holding the picker cylinder in proper relation to the shredding bar.

The picker cylinder is made as clearly shown in Fig. 3. In the present instance, the cylinder has three cast steel spiders 29. Each spider has a hub 30, a heavy perforated rim 31, and spokes 32. Picker bars 33 are arranged at an angle as shown in Fig. 3, and have curved feet 34 to fit the curved surface of the rims 31 of the spiders. The feet are perforated for the passage of the securing-bolts 35, and are countersunk, as shown in Figs. 4 and 6, to receive the heads of the bolts.

In the bar are shouldered holes for the reception of the picker teeth 36, which are curved to form a hook, as shown in Figs. 1 and 5, and are tapered at each side, as shown in Figs. 3 and 4. Each tooth has a shank 37, which extends through the picker bar and on which are nuts 38 that hold the teeth rigidly in position.

The blade is straight and the material is fed over the blade in a straight line, and by arranging the bars on the picker cylinder at an angle, as shown, the picker teeth act consecutively on the material, thus reducing the power required to operate the machine and preventing jarring of the mechanism, which occurs when the bars are parallel.

By the above construction a very substantial machine is produced, the parts of which can be accurately adjusted and held rigidly in position after adjustment.

We claim:

1. The combination in a picker, of side frames; bearings thereon; a picker cylinder mounted in the bearings; a shredder bar; means for feeding material over said bar; housings for the bar and feeding mechanism; beveled edged blocks on the frame and resting against the housings; wedges between the beveled edged blocks and the bearings for the picker cylinder, each wedge having an angular extension; stud-bolts projecting from the sides of the bearings and through the angular extensions of the wedges; and nuts on the bolts by which the wedges are adjusted.

2. The combination in a picker, of side frames; bearings thereon; a curved shredding bar having a flat extension at one side and a plate at the opposite side, said plate being curved at its upper end to conform with the curve of the bar; means for adjusting the bar toward and from a picker; a yieldingly mounted toothed feed roller above the bar; two corrugated feed rolls for feeding the material to the toothed feed roller; a cylinder mounted in the bearings on the frame; and toothed bars secured to the cylinder and arranged so as to travel close to the upper edge of the plate carried by the shredding bar.

THOMAS W. ALLEN.
WILLIAM F. BOKUM.